United States Patent

Nilssen

[11] Patent Number: 5,998,936
[45] Date of Patent: Dec. 7, 1999

[54] FIRE-INITIATION-SAFE LIGHTING SYSTEM

[76] Inventor: Ole K. Nilssen, Caesar Dr., Barrington, Ill. 60010

[21] Appl. No.: 08/155,519

[22] Filed: Nov. 22, 1993

Related U.S. Application Data

[63] Continuation-in-part of application No. 07/821,296, Jan. 13, 1992, abandoned, which is a continuation of application No. 07/540,877, Jun. 21, 1990, abandoned, which is a continuation of application No. 07/255,379, Oct. 11, 1988, abandoned, which is a continuation of application No. 06/569,262, Jan. 9, 1984, abandoned.

[51] Int. Cl.$^6$ ...................................................... H05B 41/36
[52] U.S. Cl. ........................................ 315/209 R; 315/219
[58] Field of Search .......................... 315/209 R, DIG. 2, 315/DIG. 3, DIG. 5, 246, 315, 219, 307, 56, DIG. 1

[56] References Cited

U.S. PATENT DOCUMENTS 3,801,865   4/1974   Roberts ..................................... 315/187

FOREIGN PATENT DOCUMENTS 633937   of 0000   Canada .

*Primary Examiner*—Ali Neyzari

[57] ABSTRACT

A lighting system for a suspended ceiling comprises a plurality of power conditioning units permanently wired-in with the 120 Volt/60 Hz power line and mounted in various suitable locations on the permanent ceiling above the suspended ceiling. Each power conditioning unit conditionally provides a voltage at each of several multi-connector power output ports. Each power output port is operable: (i) to connect with a special lighting fixture by way of a light-weight flexible disconnectable connect cord; and (ii) on receipt of a special signal from the lighting fixture, to power the lamp(s) therein. Plural such special lighting fixtures are mounted in the suspended ceiling, with each lighting fixture being connected with and powered from one of the power output ports of a power conditioning unit mounted somewhere nearby on the permanent ceiling above. Due to the manifestly power-limited nature of the output of each of the power output ports, as combined with the light-weight flexible and detachable nature of the connect cords, each special lighting fixture may be made without the usual concerns with respect to fire-initiation safety and may be treated as a plug-in portable lighting product; which implies particularly low cost and a high degree of flexibility in installation and use.

27 Claims, 5 Drawing Sheets

FIRE-INITIATION-SAFE LIGHTING SYSTEM

RELATED APPLICATIONS

This is a Continuation-in-Part of Ser. No. 07/821,296 filed Jan. 13, 1992 now abandoned; which is a Continuation of Ser. No. 07/540,877 filed Jun. 21, 1990 now abandoned; which is a Continuation of Ser. No. 07/255,379 filed Oct. 11, 1988 now abandoned; which is a Continuation of Ser. No. 06/569,262 filed Jan. 9, 1984 now abandoned.

BACKGROUND OF THE INVENTION

1. Field of Invention

The present invention relates to a lighting systems wherein the power to each of a plurality of lighting fixtures is provided in the form of a power-limited, and thus fire-initiation-safe, voltage by way of plug-in flexible light-weight cords from remotely located permanently installed power supplies.

2. Description of Prior Art

Lighting systems for general purpose lighting normally consists of permanently wired-in lighting fixtures, with each lighting fixture obtaining its power directly from the regular power line. Since the amount of power available from such a regular power line is large enough to be considered dangerous from a fire-initiation viewpoint, it is required by the National Electrical Code that electrical conductors and other products connected directly with such a power line be made and/or installed in very special ways. For instance, electrical conductors typically have to be installed in the form of armored cable or within steel conduits.

As a result of the need for such protective measures, the powering of lighting fixtures directly from the power line must be done by relatively costly and inflexible means—with the net effective result that these lighting fixtures, once installed, become non-movable entities. Such non-movability, especially in connection with suspended ceiling systems, is a great limitation on the utility of the overall lighting system.

SUMMARY OF THE INVENTION

Objects of the Invention

An object of the present invention is that of providing an improved and easy-to-install ceiling lighting system for general lighting purposes.

Other objects, features and advantages of the present invention will become apparent from the following description and claims.

Brief Description

In an initial embodiment, which relates to a suspended ceiling system, subject lighting system consists of a plurality of individual frequency-converting power conditioning units, each mounted on the permanent ceiling above the suspended ceiling and hard-wired to the electric utility power line. The output from each power conditioning unit is a relatively high frequency (30 kHz) power-limited voltage; which output is limited to a maximum of 100 Volt-Ampere in accordance with specifications for Class-3 circuits (as defined by the National Electrical Code) and applied by way of a plug-in light-weight flexible two-wire electric connect cord to a special fluorescent lighting fixture mounted below in the grid of the suspended ceiling system.

Each of the power conditioning units is installed on the permanent ceiling in a location above an area in the suspended ceiling where a lighting fixture is apt to be needed.

The current-limited voltage output from each power conditioning unit is available from a two-terminal female receptacle means capable of receiving a two-prong male plug means.

Each special fluorescent lighting fixture has a high frequency voltage input receptacle in the form of a recessed two-prong male plug means capable of receiving a two-terminal female receptacle means.

Thus, by way of the light-weight flexible two-wire connect cord, which has a two-prong male plug means at its one end and a two-terminal female receptacle means at its other end, a special lighting fixture installed in the suspended ceiling can be connected with and powered from a power conditioning unit mounted on the permanent ceiling somewhere in the area above that lighting fixture's location in the suspended ceiling.

Due to the Class-3 power-limited nature of the output of each of the power conditioning units, as combined with the light-weight, flexible and detachable nature of the connect cords, each individual special lighting fixture may be treated as a plug-in portable lighting product.

In other words, in approximate net effect, subject system consists of special non-fixtured lighting fixtures whose ballasting means have been removed and permanently mounted externally of the fixtures and disconnectably connected with the fixtures by way of flexible two-wire connect cords.

In the presently preferred embodiment, which also relates to a suspended ceiling system, a plurality of power conditioning units are each mounted on the permanent ceiling above the suspended ceiling and hard-wired to the electric utility power line. Each power conditioning unit has typically four separate power output ports; and the output from each power output port is electronically controlled such as not to constitute a fire-initiation hazard.

More particularly, each power output port is represented by a six-terminal output receptacle functional to receive and hold a plug at one end of a six-conductor connect cord, whose other end has a plug operative to plug into a six-terminal input receptacle on an electronic ballast; which ballast, in turn, is plug-connected with a lighting panel in the suspended ceiling below.

With the output receptacle properly connected with its associated ballast and lighting panel, a 240 Volt DC voltage is provided between a certain pair of its six terminals; which 240 Volt DC voltage is then used for powering the electronic ballast; which, in turn, powers the lighting panel. However, with any other load connected with and/or between any two or more of its six terminals, or between any one or more of these six terminals and ground, no voltage higher than 10 Volt is provided between any two of the six terminals or between any one of the six terminals and ground, nor can more than 100 milli-Ampere be drawn.

Thus, without its proper load connected, each individual power output port is safe both from electric shock hazard as well as from fire-initiation hazard. With its proper load connected, none of the receptacle's six terminals is accessible (e.g., such as to be touched by a persons finger) and safety from electric shock hazard is therefore maintained.

Yet, with a proper load connected, the 240 Volt DC voltage is provided between two of the connect cord's six conductors, and up to 100 Watt may be drawn by this proper load. More than 100 Watt is prevented from being drawn by way of current-sensing control circuitry connected within the power conditioner.

If, with a proper load connected, the connect cord were to be damaged such as to expose the two conductors between which is provided the 240 Volt DC voltage, and if some loading means were to be connected between these two exposed conductors, no more than 5 milli-Ampere would be permitted to be supplied; which means that safety is maintained from both electric shock hazard and fire-initiation hazard; which safety is maintained by: (i) monitoring the magnitude of the current flowing out of the power output port as well as the magnitude of the current being received by the electronic ballast; (ii) observing the difference between these two magnitudes; and (iii) causing the 240 Volt DC voltage to be removed in case this difference exceeds a predetermined level (e.g., 5 milli-Ampere).

Similarly, if the magnitude of the DC voltage received by the electronic ballast is substantially different from the magnitude of the DC voltage present at the output port, the 240 Volt DC voltage would be removed.

Thus, electric shock hazard and fire-initiation hazard are both maintained in case the connect cord were to be damaged in some way while still still maintaining all its connections with its proper load.

The way, that a proper load is distinguished from an improper load is that a proper load is functional to receive a 10 Volt squarewave voltage provided between two of the six terminals of the output receptacle and to convert this squarewave voltage into a certain coded control voltage; which coded control voltage is then transmitted from the proper load back to the output receptacle. Then, upon receipt of this coded control voltage, the 240 Volt DC voltage is caused to be connected with said certain pair of the output receptacle's terminals.

DESCRIPTION OF THE INITIAL EMBODIMENT

Details of Construction re Initial Embodiment

Figure 1:
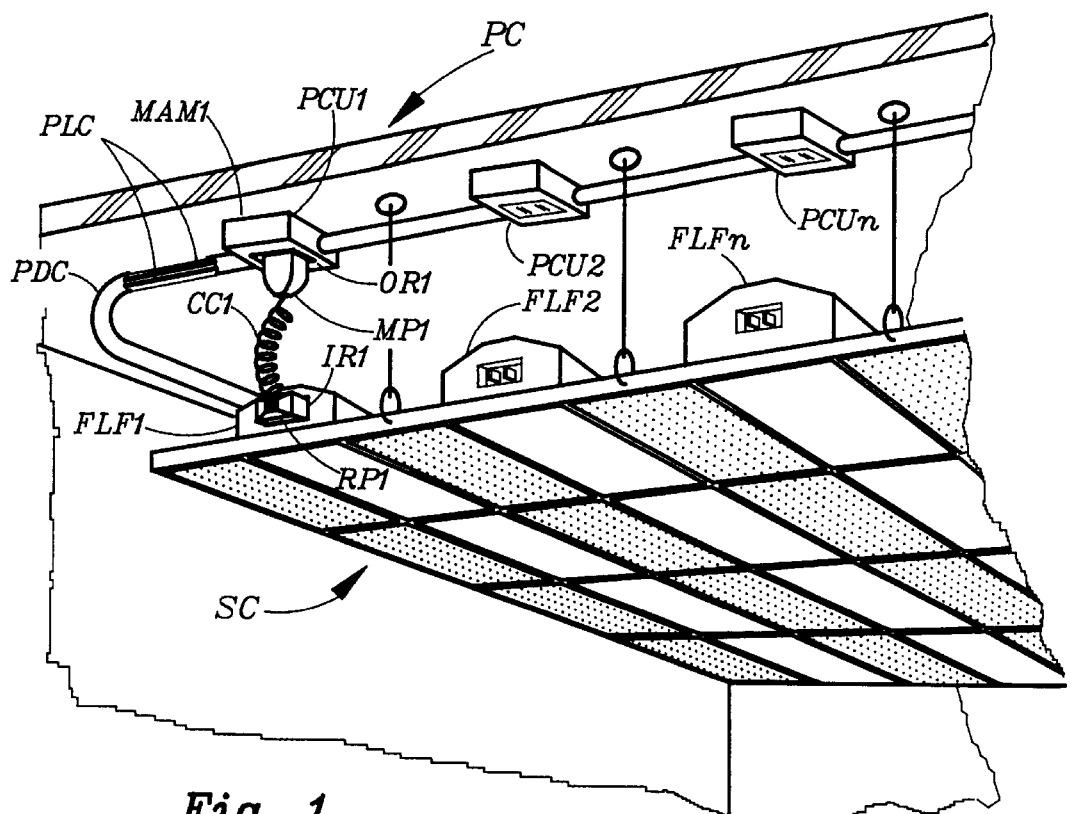
FIG. 1 illustrates from a systems viewpoint the initial embodiment of the overall Class-3 lighting system of the present invention.

In FIG. 1, by way of a pair of power line conductors PLC within a power distribution conduit PDC mounted on and along the permanent ceiling PC above a suspended ceiling SC, ordinary non-power-limited 120 Volt/60 Hz voltage is provided by direct hard-wire connections to a plurality of power conditioning units PCU1, PCU2—PCUn; which power conditioning units are also mounted on the permanent ceiling.

Each power conditioning unit has a power output receptacle, such as OR1 of power conditioning unit PCU1. Plugged into OR1 is a two-prong male plug MP1 mounted at one end of light-weight flexible two-wire connect cord CC1.

Non-permanently mounted in the suspended ceiling is a plurality of fluorescent lighting fixtures FLF1, FLF2—FLFn; each of which has an input receptacle, such as IR1 on FLF1. Plugged into IR1 is a two-terminal female receptacle plug RP1, which is mounted at the other end of connect cord CC1.

Each of the fluorescent lighting fixtures is connected with a power conditioning unit by way of a connect cord such as CC1.

Figure 2:
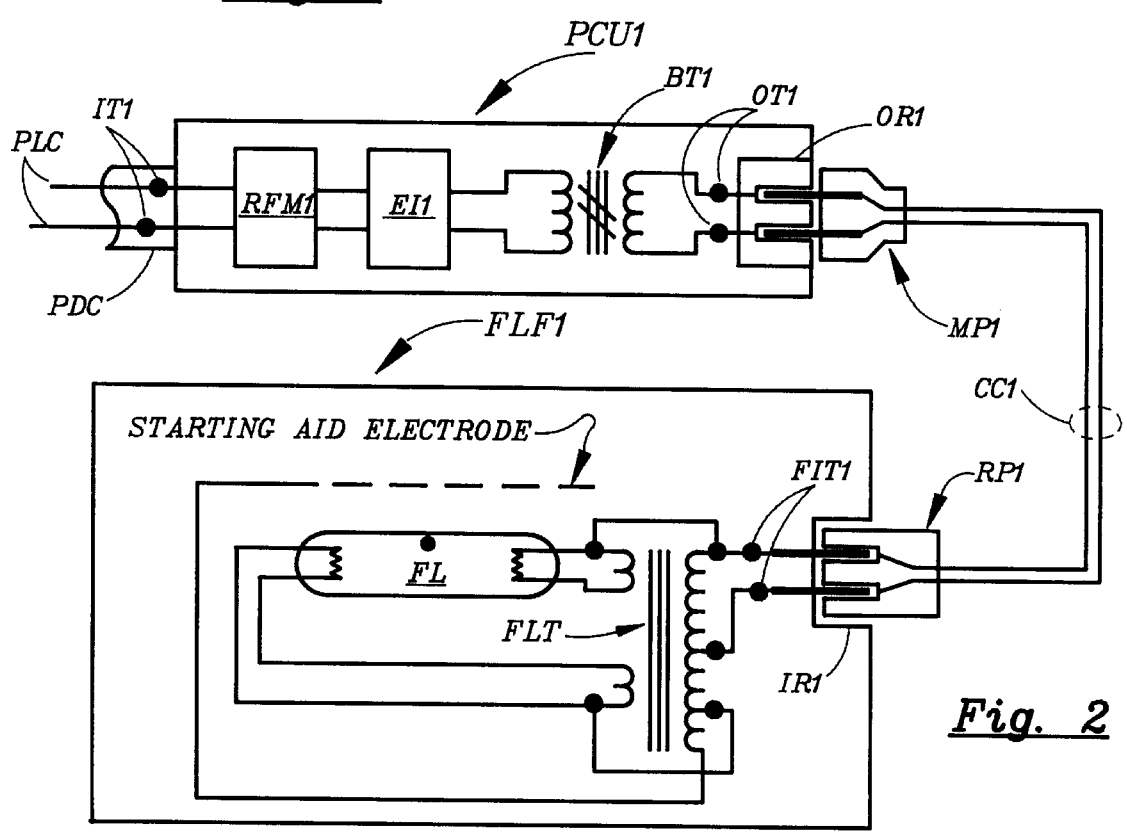
FIG. 2 shows electrical circuit details of a power conditioner unit as coupled with a special fluorescent lighting fixture.

FIG. 2 illustrates electrical circuit details of power conditioning unit PCU1 and fluorescent lighting fixture FLF1—showing the non-power-limited 120 Volt/60 Hz voltage from power line conductors PLC connected with input terminals IT1 of PCU1.

In PCU1, rectifier and filter means RFM1 is connected with input terminals IT1 and provides a DC voltage to electronic inverter EI1.

A current-limiting high-frequency ballasting transformer BT1 is connected in circuit between the output of inverter EI1 and output terminals OT1 of PCU1.

The power-limited high-frequency voltage provided at output terminals OT1 is applied by two-wire connect cord CC1 to input terminals FIT1 of fluorescent lighting fixture FLF1, which fixture includes a fluorescent lamp FL1 connected with input terminals FIT1 by way of fluorescent lamp transformer FLT1.

Details of Operation re Initial Embodiment

With reference to FIGS. 1 and 2, the operation of subject Class-3 lighting system may be explained as follows.

Non-power-limited 120 Volt/60 Hz voltage is provided to each one of the plurality of power conditioning units (such as to PCU1), which are non-disconnectably mounted on the permanent ceiling PC above the suspended ceiling SC.

Each power conditioning unit, by way of its rectifier and inverter means, converts the non-power-limited 120 Volt/60 Hz voltage to a 30 kHz substantially non-power-limited voltage; which 30 kHz non-power-limited voltage is then applied to a manifestly current-limiting transformer (i.e., a transformer with a substantial amount of leakage inductance). The output from this transformer is a power-limited 10 Volt/30 kHz voltage; which output is then applied to the power conditioning unit's output receptacle (such as OR1 in PCU1).

By way of disconnectable flexible cord means (such as CC1), each of the plurality of fluorescent lighting fixtures (such as FLF1) is connected with a power conditioning unit (such as PCU1), and is thereby provided with an input of power-limited 10 Volt/30 kHz voltage. This voltage is then, within each lighting fixture, applied to a fluorescent lamp transformer (such as FLT1), which transforms the 100 Volt/30 kHz input voltage to a voltage level appropriate for starting and operating the fluorescent lamp. Also, this fluorescent lamp transformer provides auxiliary outputs for low-voltage heating of the fluorescent lamp cathodes as well as for lamp starting aid.

To be acceptable in Class-3 applications, each of the plurality of power conditioning units has output characteristics conforming to the specifications provided for Class-3 circuits in Part C of Article 725 of the 1984 National Electrical Code.

Because of the Class-3 characteristics of the power conditioning units, the amount of power available from their output receptacles (such as OR1 on PCU1) is limited to a level considered acceptably safe from a fire initiation viewpoint. Yet, that amount of power—which may be as high as 100 Watt—is quite adequate to provide for ample light output from a fluorescent lighting fixture.

Due to the high-frequency operation, the fluorescent lamp transformer within each fixture (such as FLT1 in FLF1) can be extremely small and light-of-weight; which, especially when combined with the reduced fixture/structural requirements due to the Class-3 characteristics, permits the fluorescent lighting fixtures to be particularly compact and light-of-weight.

Thus, because of their Class-3 nature, the fixtures in subject lighting system may be considered as ordinary portable (plug-in) lighting products; which implies that they may be installed, moved, removed, and/or exchanged by unskilled persons.

And, because of their light weight, they are particularly easy to handle.

Additional Comments re Initial Embodiment (a) Class-2 operation (as defined in Article 725 of the 1984 National Electrical Code) may be employed as a near-equivalent alternative to Class-3 operation.

(b) Subject power conditioning units may be part of and/or comprised within substantially ordinary junction boxes.

(c) Except for Class-2 operation, there is no basic need for the ballasting transformers in the power conditioning units to have isolated secondary windings.

(d) In order to provide a Class-3 lighting system, it is not fundamentally necessary for the power conditioning units to provide frequency conversion. Rather, it would be possible —although generally not very advantageous—to have the power conditioning units provide 60 Hz power-limited output and to make the fixtures operate on 60 Hz input.

(e) Subject Class-3 lighting system is not limited to be used with fluorescent lighting fixtures. Rather, it may just as well be used with H.I.D. and/or incandescent lighting fixtures.

(f) While two-wire connection between the power conditioning units and the fluorescent lighting fixtures is advantageous as compared with multi-wire connection, it is definitely not a requirement for achieving Class-3 status.

(g) The term "lighting fixture" as used herein does not necessarily refer to a permanently installed (or fixtured) lighting product, but rather refers more generally to a lighting means of a type capable of holding one or more incandescent, fluorescent and/or H.I.D. lamps, and suitable for general lighting applications; which lighting means— were it not for the Class-3 provisions—would normally have to be fixtured.

(h) The 1984 National Electrical Code is published by NATIONAL FIRE PROTECTION ASSOCIATION, BATTERY PARK, QUINCY, MASS. 02269.

(i) The 1984 National Electrical Code, and particularly Article 725 thereof, is herewith by reference made part of this specification.

(j) Each of the power conditioning units of FIGS. 1 and 2 may simply be considered as a remote ballasting means for the fluorescent lamp in the lighting fixture to which it is connected.

DESCRIPTION OF THE PREFERRED EMBODIMENT

Details of Construction re Preferred Embodiment

Figure 3:
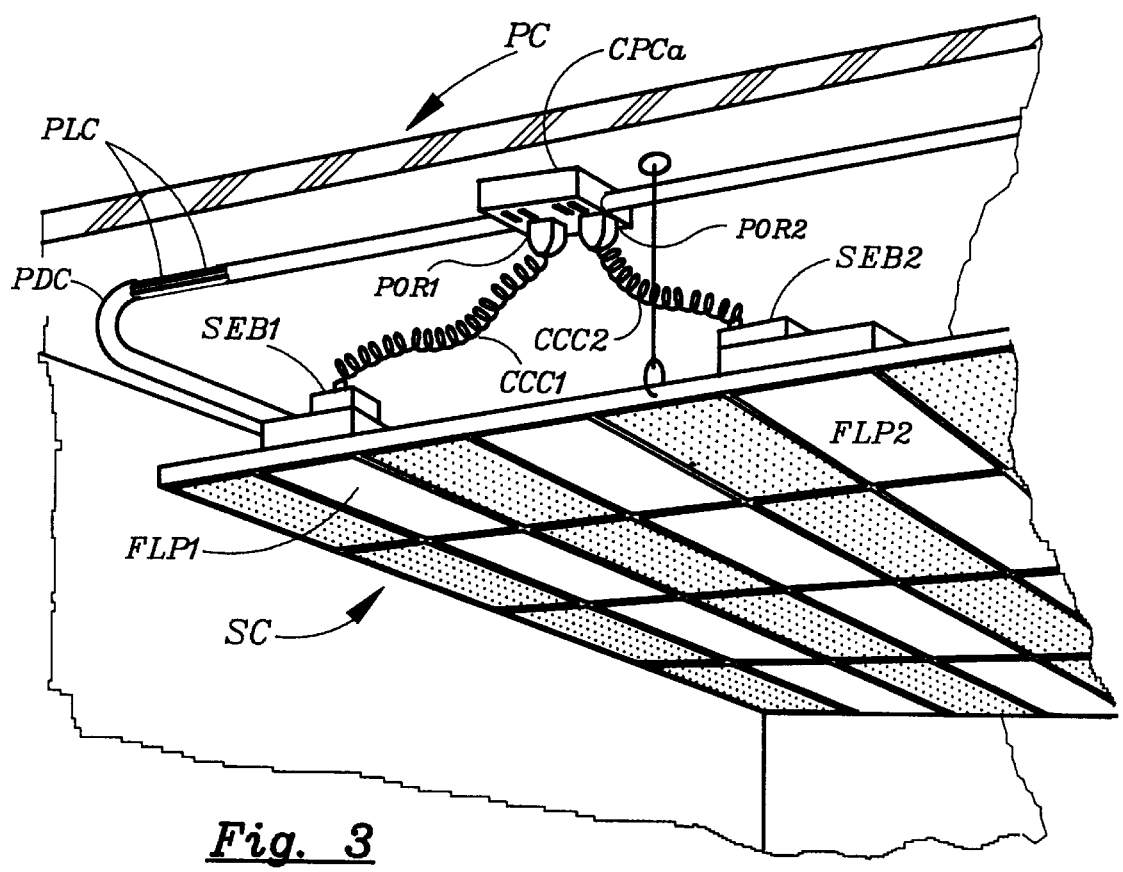
FIG. 3 illustrates from a systems viewpoint the presently preferred embodiment of the present invention.

FIG. 3 illustrates instant Fire-Initiation-Safe Lighting System from a systems perspective.

In FIG. 3, suspended ceiling SC is suspended some distance below permanent ceiling PC. Power line conductors PLC distributes ordinary non-power-limited (i.e., non-fire-initiation-safe) 120 Volt/60 Hz power line voltage by way of power distribution conduit PDC to a central power conditioner CPCa; which central power conditioner CPCa is but one of a plurality of central power conditioners (not shown) connected with power line conductors PLC at spaced-apart points along power distribution conduit PDC.

Central power conditioner CPCa has four power output receptacles, of which two are labelled POR1 and POR2; which two receptacles POR1 and POR2 are connected by way of coiled connection cords CCC1 and CCC2 to smart electronic ballasts SEB1 and SEB2 mounted on fluorescent lighting panels FLP1 and FLP2, all respectively.

Figure 4:
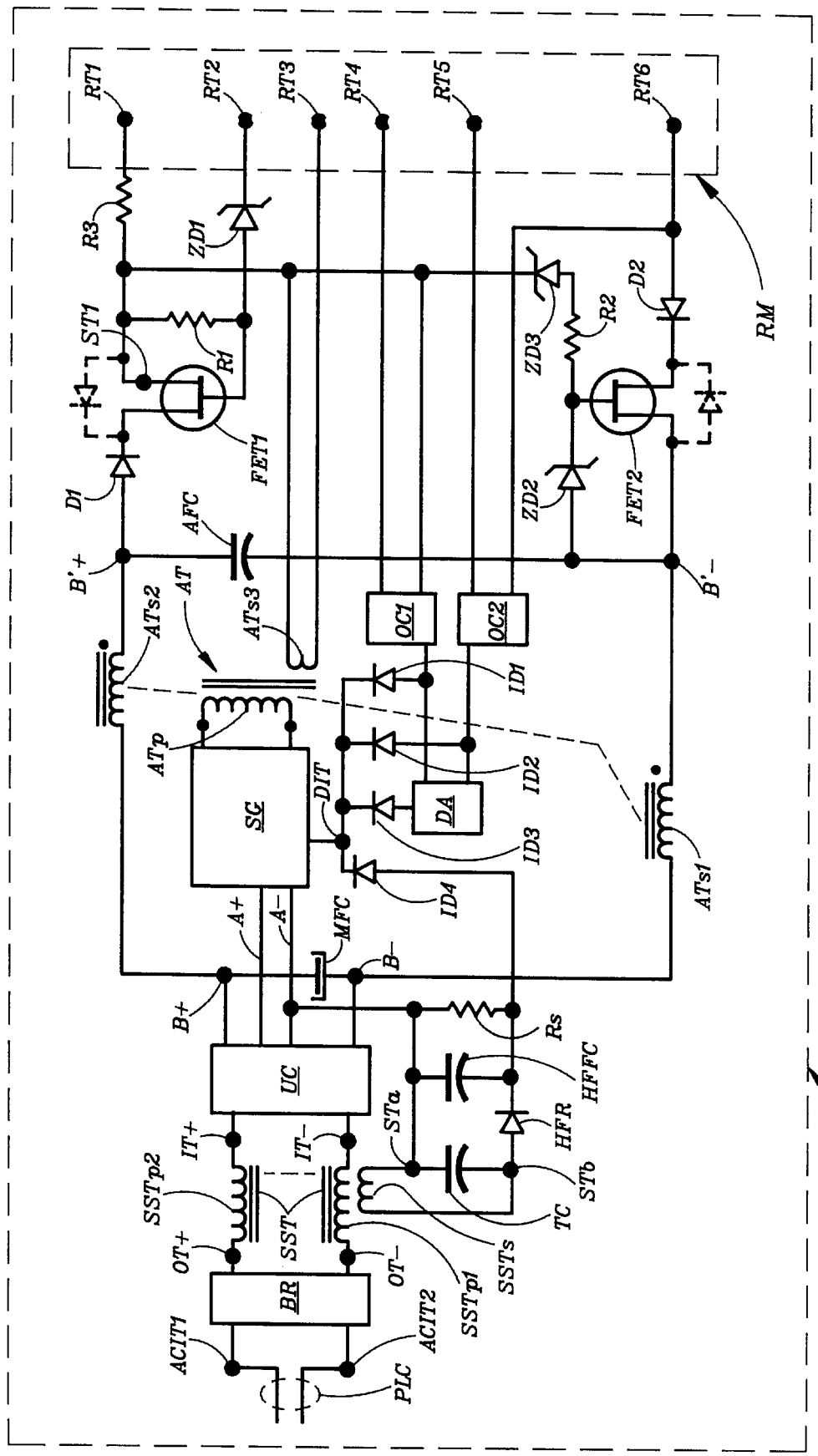
FIG. 4 represents the circuit diagram of one of the four-port power conditioning units used in the FIG. 3 embodiment.

FIG. 4 represents a circuit diagram of central power conditioner CPCa of FIG. 3.

In FIG. 4 a bridge rectifier BR has DC output terminals OT– & OT+, as well as AC input terminals ACIT1 & ACIT2; which AC input terminals are connected with power line conductors PLC.

A DC-to-DC up-converter UC has a negative input terminal IT– and a positive input terminal IT+. Terminal IT– is connected with terminal OT– by way of a first primary winding SSTp1 of a shock sensing transformer SST, whose second primary winding is connected between terminals OT+ and IT+.

Transformer SST has a secondary winding SSTs connected between terminals STa & STb. A tuning capacitor TC is also connected between terminals STa & STb. Terminal STb is connected with the anode of a high frequency rectifier HFR, whose cathode is connected with one terminal of a high-frequency filter capacitor HFFC, whose other terminal is connected with terminal STa. A resistor Rs is connected in parallel with capacitor HFFC.

Up-converter UC has a pair of main DC output terminals labelled B– and B+; which two main DC output terminals are connected across a main filter capacitor MFC. Up-converter UC also has a pair of auxiliary DC output terminals labelled A+ and A–; which A– terminal is connected with terminal STa.

A signal generator SG has a pair of DC input terminals connected with the A–/A+ terminals, a disable input terminal TIP, as well as a pair of auxiliary AC output terminals connected with the primary winding ATp of an auxiliary transformer AT; which auxiliary transformer AT has two main secondary windings ATs1 and ATs2. Winding ATs1 is connected between terminal B– and a terminal B'–; and winding ATs2 is connected between terminal B+ and a terminal B'+. An auxiliary filter capacitor AFC is connected between terminals B'– and B'+.

A diode D1 has its anode connected with the B'+ terminal and its cathode connected with the drain terminal of a field effect transistor FET1, whose source terminal ST1 is connected with receptacle terminal RT1 of receptacle means RM via a resistor R3; which receptacle means RM has five additional receptacle terminals RT2 through RT6. A resistor R1 is connected between the gate terminal and source terminal ST1. A Zener diode ZD1 is connected with its anode to the gate terminal of transistor FET1 and with its cathode to receptacle terminal RT2.

A diode D2 is connected with its anode to a receptacle terminal RT6 and with its cathode to the drain terminal of a field effect transistor FET2, whose source terminal is connected with terminal B'–. A Zener diode ZD2 is connected with its cathode to the gate terminal of transistor FET2 and with its anode to terminal B'–. A Zener diode ZD3 is connected with its cathode to source terminal ST1 and, via a resistor R2, with its cathode to the gate terminal of transistor FET2.

A third secondary winding ATs3 is connected between receptacle terminals RT1 and RT3.

A first opto-coupler OC1 has a pair of input terminals connected between source terminal ST1 and receptacle terminal RT4; a second opto-coupler OC2 has a pair of input terminals connected between terminals RT5 & RT6.

Opto-coupler OC1 has its output terminal connected via a first isolation diode ID1 to a disable input terminal DIT of signal generator SG. Opto-coupler OC2 has its output terminal connected via a second isolation diode ID2 to disable input terminal DIT. Both isolation diodes have their cathodes connected with disable input terminal DIT.

The output terminals from opto-couplers OC1 & OC2 are connected with the input terminals of a differential amplifier DA, whose output terminal is connected with disable input terminal DIT via a third isolation diode ID3—the cathode of diode ID3 being connected with terminal DIT.

A fourth isolation diode ID4 is connected with its anode to the cathode of high frequency rectifier HFR and with its cathode to disable input terminal DIT.

Figure 5:
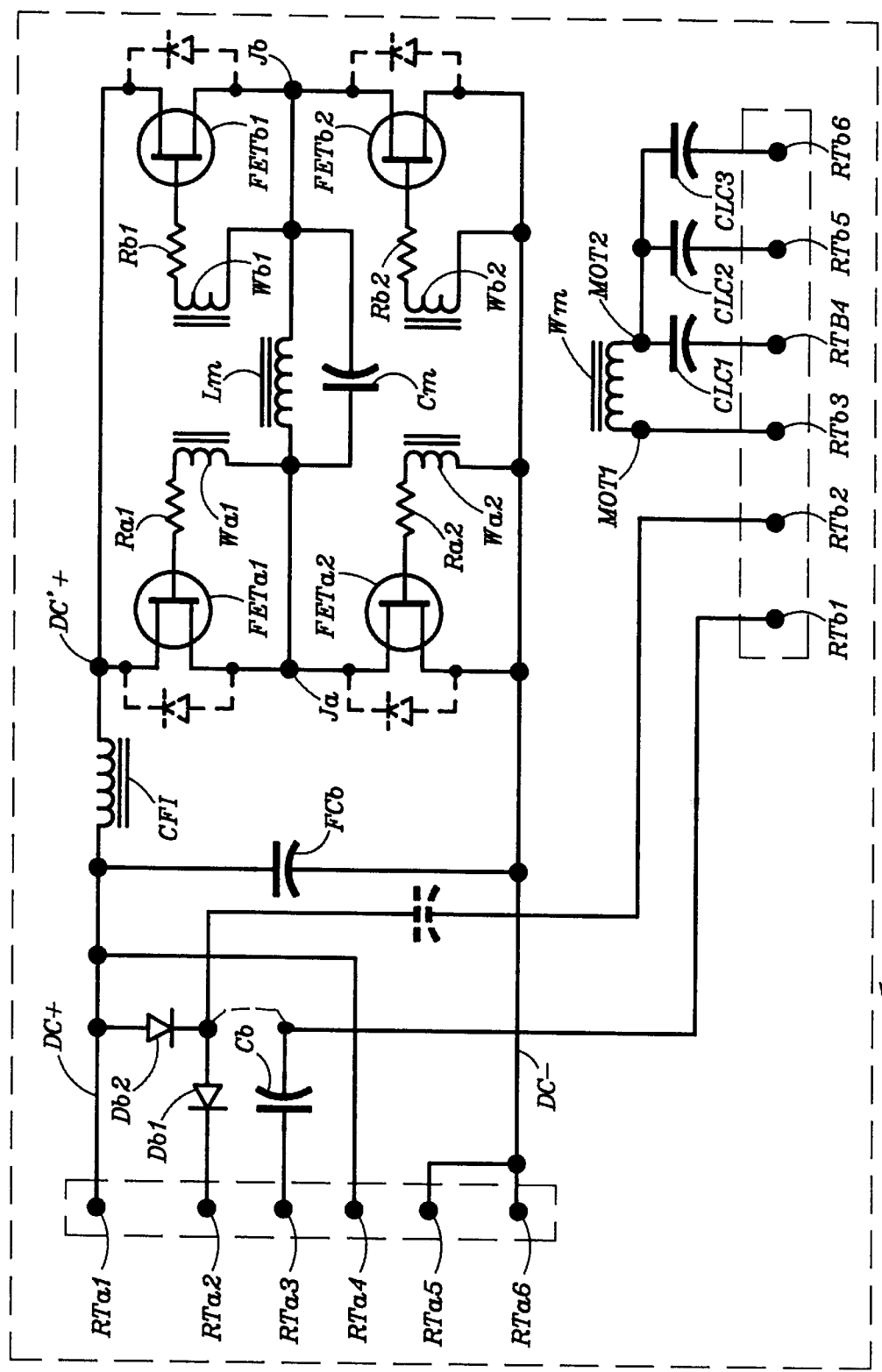
FIG. 5 represents the circuit diagram of one of the electronic ballasts used in the FIG. 3 embodiments.

FIG. 5 represents a circuit diagram of smart electronic ballast SEB1 of FIG. 3.

In FIG. 5, six receptacle terminals at the input side of ballast SEB1 are labelled RTa1 through RTa6; and six receptacle terminals at the output side of ballast SEB1 are labelled RTb1 through RTb6.

Terminal RTa1 is connected directly to terminal RTa4; and terminal RTa6 is connected directly to terminal RTa5. Terminal RTa3 is connected with terminal RTb1 by way of a capacitor Cb. Terminal RTa2 is connected with the cathode of a diode Db1, whose anode is connected with the cathode of a diode Db2. The anode of diode Db2 is connected with terminal RTa1.

Terminals RTa1 and RTa6 are also connected to a DC+ bus and a DC− bus, respectively. A high-frequency filter capacitor FCb is connected between the DC− bus and the DC+ bus. A current feed inductor CFI is connected between the DC+ bus and a DC'+ junction.

A field effect transistor FETa1 is connected with its drain terminal to the DC'+ junction and with its source terminal to a junction Ja; a field effect transistor FETa2 is connected with its drain terminal to the Ja junction and with its source terminal to the DC− bus.

A field effect transistor FETb1 is connected with its drain terminal to the DC'+ junction and with its source terminal to a junction Jb; a field effect transistor FETb2 is connected with its drain terminal to the Jb junction and with its source terminal to the DC− bus.

A main tank inductor Lm and a main tank capacitor Cm are connected in parallel with each other so as to form a parallel-combination; which parallel-combination is connected between junctions Ja and Jb.

Tightly coupled with inductor Lm are four drive windings Wa1, Wa2, Wb1 and Wb2 as well as a main output winding Wm; which main output winding Wm has two main output terminals MOT1 and MOT2. Winding Wa1 is series-connected with a resistor Ra1 to form a series-combination; which series-combination is connected between the source and the gate terminals of transistor FETa1. Winding Wa2 is series-connected with a resistor Ra2 to form a series-combination; which series-combination is connected between the source and the gate terminals of transistor FETa2. Winding Wb1 is series-connected with a resistor Rb1 to form a series-combination; which series-combination is connected between the source and the gate terminals of transistor FETb1. Winding Wb2 is series-connected with a resistor Rb2 to form a series-combination; which series-combination is connected between the source and the gate terminals of transistor FETb2.

Main output terminal MOT1 is directly connected to terminal RTb3; main output terminal MOT2 is connected with terminals RTb4, RTb5, RTb6 via current-limiting capacitors CLC1, CLC2, CLC3—all respectively.

Figure 6:
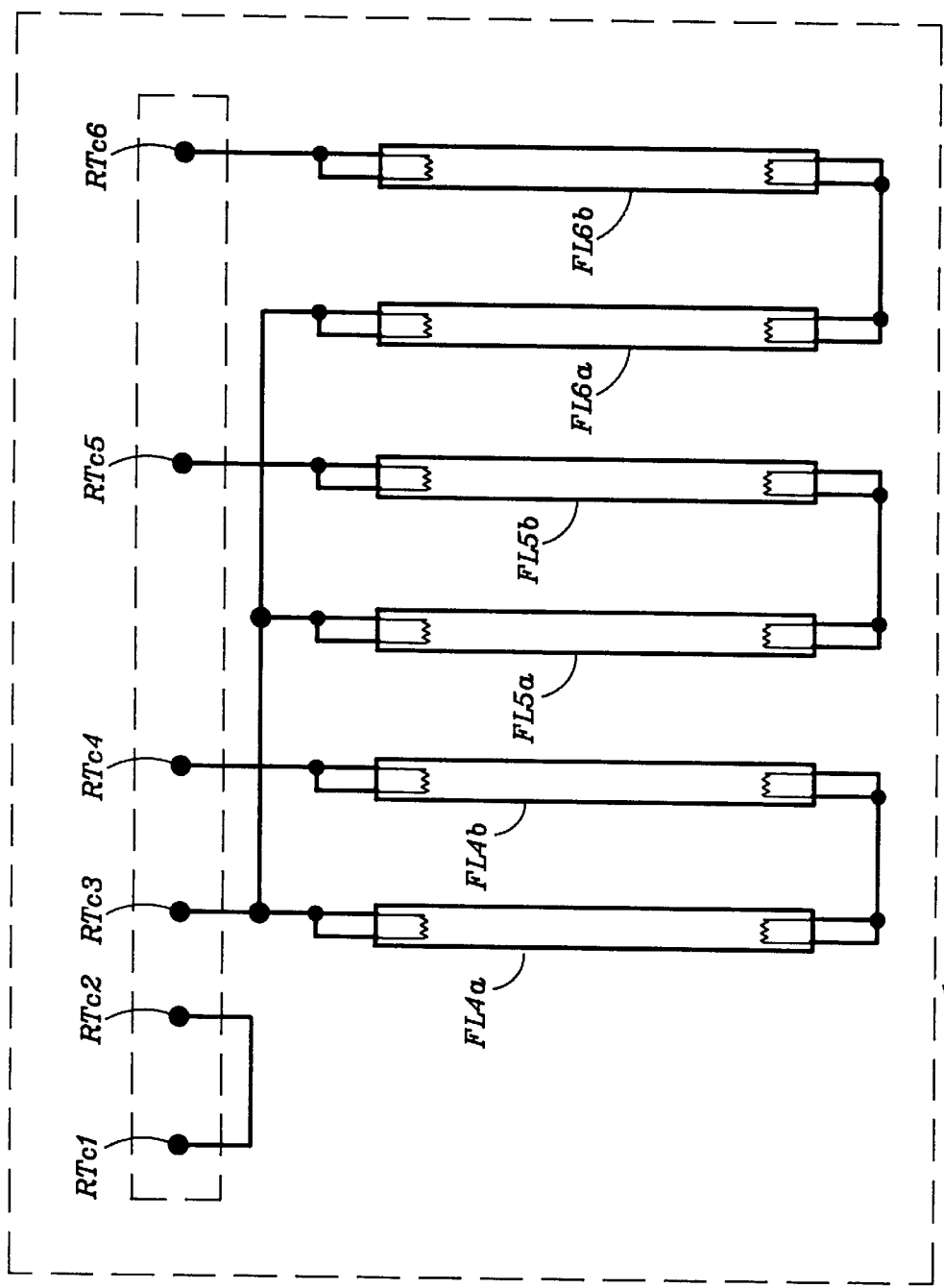
FIG. 6 represents the circuit diagram of one of the lighting panels used in the FIG. 3 embodiment.

FIG. 6 represents a circuit diagram of fluorescent lighting panel FLP1 of FIG. 3.

In FIG. 6, six receptable terminals at the input of fluorescent lighting panel FPL1 are labelled RTc1 through RTc6.

Terminal RTc1 is connected directly to terminal RTc2; terminal RTc6 is connected with terminal RTc3 by way of two seres-connected fluorescent lamps FL6a and FL6b; terminal RTc5 is connected with terminal RTc3 by way of two series-connected fluorescent lamps FL5a and FL5b; and terminal RTc4 is connected with terminal RTc3 by way of two series-connected fuorescent lamps FL4a and FL4b.

Details of Operation re Preferred Embodiment

The function and operation of the lighting system of FIG. 3 are similar to those of the lighting system of FIG. 1; the most significant differences being that:

(A) Each fixtured (i.e., power-line-connected) power conditioner has plural output ports (as contrasted with only one), with each individual output port:
  (i) having a six-terminal receptacle means (as contrasted with a two-terminal receptacle means);
  (ii) except when being provided with a special signal between a certain pair of its receptacle terminals, being prevented from delivering from its receptacle terminals more than a small fraction of the amount of power considered safe from fire-initiation hazard (as contrasted with being prevented from delivering up to the full amount of power considered safe from fire-initiation hazard);
  (iii) except when being provided with said special signal, being prevented from providing shock-hazardous voltages between any of its receptacle terminals (as contrasted with providing a voltage of shock-harardous magnitude); and
  (iv) being operative, when properly enabled by said special signal, to provide a DC output voltage of substantially constant magnitude (as contrasted with providing a high-frequency AC output voltage); and (B) The matching circuitry required between each output port and its associated lighting panel (or fixture) is characterized by:
  (i) being located outside of the lighting panel per se (as contrasted with being an integral part thereof);
  (ii) being contained within a housing attached to the lighting panel by way of Velcro means and connected with the fluorescent lamps within the lighting panel by way of a multi-prong plug-receptacle means; and
  (iii) mainly constituting a DC-to-AC converter means (as contrasted with a high-frequency transformer means).

Additional significant differences between the lighting system of FIG. 3, as compared with the lighting system of FIG. 1, will be perceived from the following discussion regarding the component parts of the system.

A first key component part of the lighting system of FIG. 3 is that of central power conditioners CPCa; which is schematically illustrated by the circuit diagram of FIG. 4.

In FIG. 4, unfiltered full-wave-rectified power line voltage is provided between terminals OT− and OT+; which unfiltered DC voltage is also provided (substantially unchanged) at terminals IT− and IT+.

The unfiltered DC voltage provided between terminals IT− and IT+ is converted by up-converter UP to become, between terminals B− and B+ (i.e., between the B− bus and the B+ bus), a relatively high-magnitude (e.g., 240 Volt) main DC supply voltage of substantially constant magnitude.

Also, up-converter UP provides between terminals A– and A+ (i.e., between the A– bus and the A+ bus) a low-magnitude (e.g., 10 Volt) auxiliary DC supply voltage of substantially constant magnitude; which auxiliary DC supply voltage is electrically (i.e., galvanically) isolated from terminals B– and B+.

The auxiliary DC voltage powers signal generator SG; which, as long as indeed being supplied with the auxiliary DC voltage, provides a 10 kHz voltage across primary winding ATp of auxiliary transformer AT.

Secondary winding ATs3 on transformer AT is connected between terminals RT1 and RT3, and will therefore be provided to whatever load might be connected therewith.

Secondary windings ATs1 and ARs2, each of which is of the same number of turns and in phase with each other, provide for a relatively-low-magnitude 10 kHz voltage to exist between terminals B– and B'– as well as between terminals B+ and B'+.

Of course, due to the filtering effect of main filter capacitor MFC, no 10 kHz voltage can exist between terminals B– and B+; and, due to the filtering effect of auxiliary filter capacitor AFC, no 10 kHz voltage can exist between terminals B'– and B'+. However, due to the 10 kHz voltage provided by secondary winding ATs1, terminal B'– will exhibit a 10 kHz voltage with respect to terminal B–; and, due to the 10 kHz voltage provided by secondary winding ATs2, terminal B'+ will exhibit a 10 kHz voltage with respect to terminal B+.

In other words, the voltages on terminals B'– and B'+ move move up and down together at a frequency of 10 kHz with respect to the voltages on terminals B– and B+; and, as long as the circuit arrangement remains balanced, no 10 kHz current flows through capacitors MFC and AFC.

However, if an impedance were to be connected between one or both of the power line conductors (PLC) and one or both of terminals B'– and/or B'+, such as would happen in case a ground-connected person were to come in electrical contact with terminals B'– and/or B'+, a 10 kHz current would flow through the person to the ground-connected power line conductors (PLC), through rectifier BR, and through primary windings SSTp1 and SSTp2 of shock sensing current transformer SST, thereby to cause a 10 kHz voltage to develop across secondary winding SSTs (which secondary winding is tuned to resonate at 10 kHz by way of tuning capacitor TC); which 10 kHz voltage, in turn, would cause a DC voltage to develop across high-frequency filter capacitor HFFC; which DC voltage, if of sufficient magnitude, would cause signal generator SG to become disabled (by way of providing a disable signal to disable input terminal DIT) and to remain disabled for a predetermined period (e.g., 10 seconds); thereby, in turn, to cause the 10 kHz signal to disappear for the duration of this predetermined period.

The signal generator functions such that, after having been disabled, and after having remained disabled for said predetermined period, it will re-start itself. However, after such re-start, if a ground-fault current of sufficient magnitude were to continue to exist, disabling would again occur.

The DC supply voltage present between terminals B'– and B'+ is applied between receptacle terminals RT6 and RT 1, respectively, by way of diode-transistor combinations D2/FET2 and D1/FET1 (plus resistor R3), again respectively. Without being provided with gate voltages of sufficient magnitude, as indeed will be the case except if a special loading means be connected with receptacle means RM, field effect transistors FET1 and FET2 are both non-conductive (i.e., in their OFF-states). Under such a condition, a person (whether ground-connected or not) touching one or more of the receptacle terminals will not be subjected to a shock-hazardous voltage.

If a load were to be connected between terminals RT1 and RT6, no current would flow through this load without first having caused proper activation voltages to be provided to the gates of the two switching transistors (FET1/FET2).

By providing a DC control voltage of sufficient magnitude between terminals RT1 and RT2—with terminal RT1 being of negative polarity—switching transistor FET1 will be caused to enter its ON-state, which then causes the magnitude of the DC voltage at the RT1 terminal to be sufficiently high to cause the gate voltage on switching transistor FET2 to become high enought to cause this transistor also to enter its ON-state.

Recognizing that the resistance of current-sensing resistor R3 is relatively low, with both transistors FET1/FET2 in their ON-states, terminals RT6 and RT1 become connected with terminals B'+ and B'–, respectively; thereby providing the full main DC supply voltage between terminals RT6 and RT1.

The 10 kHz signal provided by signal generator SG is a squarewave voltage; and the peak magnitude of the 10 kHz squarewave voltage provided across secondary winding ATs3 is 10 Volt. Thus, with the Zener voltage of Zener diode ZD1 being 10 Volt, even if terminal RT3 were to be connected directly to terminal RT2, transistor FET1 would not be rendered conductive —not even intermittently.

The input terminals of optical coupler OC1 are connected between terminals ST1 and RT4; which means that, if the magnitude of any voltage existing between terminals RT4 and ST1 were to exceed a predetermined level, an output voltage would be provided from optical coupler OC via isolation diode ID1 to disable input terminal DIT of signal generator SG, thereby to disable signal generator SG for a predetermined duration (i.e., 10 seconds).

The input terminals of optical coupler OC2 are connected between terminals RT6 and RT5; which means that, if the magnitude of any voltage existing between terminals RT5 and RT6 were to exceed a predetermined level, an output voltage would be provided from optical coupler OC2 via isolation diode ID2 to disable input terminal DIT of signal generator SG, thereby to disable signal generator SG for a predetermined duration (i.e., 10 seconds).

The output voltages of optical couplers OC1/OC2 are provided to the input terminals of differential amplifier DA; whose output voltage is provided via isolation diode ID3 to disable input terminal DIT of signal generator SG; which means that, if the magnitude of the difference between the output voltages of optical couplers OC1/OC2 were to exceed a predetermined level, an output voltage would be provided from differential amplifier via isolation diode ID3 to disable input terminals DIT of signal generator SG, thereby to disable signal generator SG for a predetermined duration (i.e., 10 seconds).

A second key component part of the lighting system of FIG. 3 is that of smart electronic ballast SEB1; which is schematically illustrated by the circuit diagram of FIG. 5.

In FIG. 5, if a DC supply voltage of substantially constant msgnitude is provided between terminals DC– and DC+ (i.e., between the DC– bus and the DC+ bus), a substantially constant-magnitude unidirectional current will be drawn by the bridge inverter circuit through current feed inductor CFI.

The current-fed bridge inverter {which is principally constituted by switching transistors FETa1, FETa2, FETb1, FETb2 and feedback windings Wa1, Wa2, Wb1, Wb2 on main tank inductor Lm (which is parallel-connected with main tank capacitor Cm)} is made to self-oscillate by positive feedback delivered to the transistors' control terminals by the four feedback windings. The self-oscillation is initiated by providing a trigger pulse to the transistors' control terminals; which trigger pulse may be generated, for instance, by a conventional Diac-type trigger circuit (e.g., such as used for triggering Triacs).

Once triggered, the current-fed bridge inverter will generate a substantially sinusoidal voltage across the L-C tank circuit (i.e., the parallel-combination of Lm and Cm); which means that the feedback voltage provided across each of feedback windings Wa1, Wa2, Wb1, Wb2 is also sinusoidal; which sinusoidal feedback voltage is provided to each transistor's control terminals through a series-connected resistor, thereby causing the (substantially sinusoidal) voltage provided to each transistor's control terminals to be phase-delayed compared with the voltage provided directly across its associated feedback winding.

For the current-fed inverter to operate efficiently, and for the inverter's output voltage to be substantially sinusoidal, it is necessary that each transistor's ON/OFF switching be properly timed. I particular, for proper ON/OFF switching it is necessary that transistor switching be accomplished without incurring significant periods during which three or four transistors are non-conducting at the same time, and without incurring significant periods during which more than two transistors are conducting at the same time.

More particularly, in the circuit of FIG. 5, proper transistor ON/OFF switching is accomplished by causing the feedback-generated drive voltage provided to each transistor's control terminals: (i) to be delayed by a certain amount (e.g., 30 degrees) compared with the voltage provided across its associated feedback winding; and (ii) to have a peak magnitude substantially higher than what is normally required to cause the transistor to become fully conductive.

The substantially sinusoidal inverter output voltage (i.e., the voltage provided between junctions Ja and Jb) is transformed to main output terminals MOT1/MOT2 by plain transformer action in that winding Wm is tightly coupled with main inductor Lm. Thus, the main output voltage present between terminals MOT1/MOT2 is substantially sinusoidal and of magnitude sufficient to properly instant-start the series-connected lamp pairs.

Otherwise, the circuit arrangement of FIG. 5 functions such that, if a certain AC voltage were to be applied between receptacle terminals RTa1 and RTa3, and if receptacle terminals RTb1 and RTb2 were to be connected together, a DC voltage having twice the peak magnitude of said certain AC voltage would be provided between receptacle terminals RTa1 and RTa2; which DC voltage would result from voltage-doubling interaction between capacitor Cb and diodes Db1 and Db2.

A third key component part of the lighting system of FIG. 3 is that of fluorescent lighting panel FLP1; which is schematically illustrated by the circuit diagram of FIG. 6.

In FIG. 6, each of the fluorescent lamps is a so-called instant-start lamp; and each lamp-pair therefore requires twice the voltage magnitude of proper ignition as does a single lamp.

With a current-limited voltage of the proper magnitude is supplied at each of receptacle terminals RTc4, RTc5, RTc6 (as referenced to receptacle terminal RTc3), the three lamp-pairs will properly ignite and operate.

In the lighting system of FIG. 3, receptacle terminals RTc1 through RTc6 (of fluorescent lighting panel FLP of FIG. 6) are respectively connected with receptacle terminals RTb1 through RTb6 (of smart electronic ballast SEB1 of FIG. 5).

Likewise, by way of coiled connection cord CCC1, receptacle terminals RTa1 through RTa6 (of smart electronic ballast SEB1 of FIG. 5) are respectively connected with receptacle terminals RT1 through RT6 (of central power conditioner CPCa of FIG. 4).

With smart electronic ballast SEB1 and central power conditioner CPCa connected together as indicated above, receptacle terminals RT1 and RT3 (on CPCa) are connected with receptacle terminals RTa1 and RTa3 (on SEB1).

With fluorescent lighting panel FLP1 and smart electronic ballast SEB1 connected together as indicated above, receptacle terminals RT1$b$ and RT2$b$ (of SEB1) are connected with receptacle terminals RTc1 and RTc2 (of FLP1).

Thus, with FLP1, SEB1 and CPCa so connected together, the 10 kHz squarewave voltage provided between terminals RT1 and RT3 (of CPCa) gets delivered to terminals RTa1 and RTa3 (of SEB1) and, as long as terminals RTb1 and RTb2 (of SEB1) are connected together by virtue of being connected with terminals RTc1 and RTc2 (of FLP1), a 10 kHz pulsating DC voltage of 20 Volt peak magnitude will be provided between terminals RT1$a$ and RTa2 (of SEB1).

With terminals RTa1 and RTa2 (of SEB1) connected with terminals RT1 and RT2 (of CPCa), the 10 kHz DC pulses of 20 voltage peak magnitude will also be provided between terminals RT1 and RT2 (of CPCa) and, with the Zener voltage of Zener diode ZD1 being 10 Volt, will (by virtue of the filtering effect of the gate-source capacitance of transistor FET1) cause a constant-magnitude 10 Volt to be applied between the control terminals of transistor FET1, thereby to cause it to enter its ON-state; which, in turn, will cause transistor FET2 to enter its ON-state, thereby to cause the main DC supply voltage that exists between terminals B'– and B'+ to be applied between terminals RT6 and RT1 (of CPCa), and therefore also between terminals RTa6 and RTa1 (of SEB).

In other words, with lighting panel FLP1 connected with ballast SEB1 and with ballast SEB1 connected with power conditioner CPCa, the main DC supply voltage from the power conditioner will be supplied to main DC terminals DC– and DC+ of the ballast, which will cause a high-magnitude high-frequency (e.g., 600 Volt RMS and 30 kHz) sinusoidal voltage to supplied between terminal RTc3 and each of terminals RTc4, RTc5 and RTc6 (of FLP1); which high-magnitude high-frequency voltage causes each of the three lamp-pairs to ignite and draw a high-frequency current of magnitude determined primarily by the capacitance value of each of current-limiting capacitors CLC1, CLC2 and CLC3 in the ballast.

If the lighting panel were to be disconnected from its associated ballast, the ballast would cease to provide the 10 kHz DC pulses to its associated power conditioner, which would result in the main DC supply voltage being disconnected from the ballast (after a brief period determined by resistor R1).

Similarly, if the ballast were to be disconnected from its associated power conditioner, the 10 kHz DC pulses would cease to be provided, which would result in the main DC supply voltage being disconnected from the power conditioner's DC output terminals RT6 and RT1.

With the lighting panel, the ballast and the power conditioner all properly interconnected, if a low impedance load (e.g., a short circuit) were to be placed across the power conditioner's DC output terminals RT1 and RT6, the potential at terminal RT4 would become substantially different from that at terminal ST1, and a substantial current would therefor flow between the input terminals of opto-coupler OC1, thereby to cause a disable voltage to be provided to signal generator SG, thereby to disable the signal generator and, in turn, to cause transistors FET1 and FET2 to become non-conductive.

Additional Comments re Preferred Embodiment (k) For clarity, the circuit arrangement of FIG. 4 shows the control circuitry and the output terminal means for only a single power output port; which control circuitry is what controls the output provided to the output terminal means, and includes the two switching transistors, the two opto-couplers, the six-terminal receptacle means, etc.

In reality, each central power conditioner has four controlled power output ports and each power output port includes control circuitry connected between terminals B'- and B'+ and output terminals means identical to that expressly shown for the single power power port expressly illustrated in FIG. 4.

(l) In the circuit arrangement of FIG. 4, in addition to, or instead of, having opto-couplers sense and respond to the difference between magnitudes of DC supply voltages present at different places in the system, opto-couplers may be used for monitoring the magnitude of the DC current flowing from the main DC output terminals (RT1, RT6), and to deliver a disable voltage to the signal generator in case the magnitude of the DC output current exceeds some predetermined level.

In particular, it is anticipated that—as an alternative and as a highly desirable arrangement for electric shock protection—an opto-coupler may be placed in series with each of the main DC output terminals. Each opto-coupler would then provide a disable voltage to the signal generator in case: (i) the magnitude of the DC current were to exceed some predetermined level, thereby protecting against fire-initiation hazards; and/or (ii) the difference in the magnitude of the current flowing out of terminal RT1 would be significantly different from that of the current flowing into terminal RT6, thereby providing for shock-hazard protection.

(m) Although the magnitude of the main DC supply voltage in the power conditioner of FIG. 4 (being about 240 Volt) is substantially higher than what is usually considered safe from electric shock hazard, by causing the supply of DC voltage to switch off in case of ground-fault current, Class-2-equivalent shock-hazard safety may be attained by providing for sufficient sensitivity to the magnitude of any ground-fault current; namely: by causing switch-off in case the magnitude of any ground-fault current were to exceed 5 milli-Ampere.

(n) For functional reasons, though perhaps not for cost-effectivity reasons, a particularly attractive circuit arrangement is that of using:

(na) the opto-couplers (OC1/OC2) in the central power conditioner (CPCa) for sensing the magnitude of the current flowing from the main DC output terminals RT1/RT6 (in CPCa)—feeding the outputs from these opto-couplers into the differential amplifier (DA) as well as to the disable input terminal (DIT) of the signal generator (SG);

(nb) an additional pair of opto-couplers for sensing the magnitude of the current flowing into the main DC input terminals (RTa1/RTa6) of the smart electronic ballast (SEB1), transmitting the resulting output signals to the central power conditioner (CPCa) by way of terminal pairs RTa4/RTa5 and RT4/RT5 (or via extra terminals, as required); and (nc) several (e.g., three) additional differential amplifiers receptive of various combinations of the output signals (i.e., via diode isolating gates) from the original as well as the additional pair of opto-couplers, with the output from each of these additional differential amplifiers being supplied to the disable input terminal (DIT) of the signal generator (SG).

With this arrangement, the output from the central power conditioner will be disrupted (i.e. switched off) for at least a predetermined period of time (e.g., 10 seconds) under any of several different circumstances, such as: (i) if the magnitude of the current flowing out of main DC output terminals RT1/RT6 of the central power conditioner (CPCa) were to be higher by more than a predetermined amount than the magnitude of the current flowing into the main DC input terminals (RTa1/RTa6) of the smart electronic ballast (SEB1); (ii) if the magnitude of the current flowing into/out-of one of the main DC output terminals (e.g., RT1) were to be different by more than a predetermined absolute amount from the magnitude of the current flowing into/out-of the other of the main DC output terminals (e.g., RT6); (iii) if the magnitude of the current flowing from one of the main DC output terminals (RT1/RT2) of the central power conditioner (CPCa) were to exceed a predetermined level; (iv) if the smart electronic ballast (SEB1) were to be briefly disconnected from the central power conditioner (CPCa); and (i) if the fluorescent light panel (FLP1) were to be briefly disconnected from the smart electronic ballast (SEB1).

(o) The central power conditioner schematically illustrated by FIG. 4 have applications other than that expressly illustrated by FIG. 3. That is, it may be used in most any situation calling for a Class-2 or a Class-3 power supply.

In fact, due to its shock hazard prevention feature, as combined with its fire-initiation-safe feature, it may be considered to constitute a Class-2-equivalent power source.

(p) The term "ground fault current" refers to current flowing from some point connected with the power output terminals of the power conditioner, via some path external of the power conditioner, and back into the power conditioner by way of its power input terminals.

In the central power conditioner (CPCa) of FIG. 4 the output voltage is a unidirectional voltage; and a low-magnitude unidirectional ground fault current is particularly hard to sense. To facilitate detecting a ground-fault condition, a special 10 kHz voltage is—from within the power conditioner—impressed between the power input terminals and the power output terminals. Thus, if placing an AC volt-meter between either one of the power input terminals and either one of the power output terminals, it would register a 10 kHz voltage of a certain magnitude. This 10 kHz voltage is that provided by windings ATs1 and ATs2 on auxiliary transformer AT.

Thus, if an external impedance path (such as a ground-connected person) were to be established between the power conditioner's power output terminals and power input terminals, a 10 kHz current would flow through this impedance path; and the magnitude of the resulting 10 kHz current would be a measure of the magnitude of any other ground fault current which might be flowing through this path.

That is, in the power conditioner of FIG. 4, a ground-fault condition is sensed by way of sensing the magnitude of any 10 kHz (ground-fault) current flowing through the primary windings (i.e., windings SST1 and SST2) of a current transformer, whose secondary winding (SSTs) is tuned to natural resonance at 10 kHz.

(q) An important feature of the power conditioner (CPCa) of FIG. 4 is associated with the fact that the Zener voltage of Zener diode ZD3 is higher than the peak magnitude of the power line voltage. If that were not so, it would be possible to cause transistor FET2 to become conductive merely by connecting terminal FT1 to one of the power input terminals (ACIT1/ACIT2).

Thus, with reference to FIG. 4, under a condition where no "smart" load (e.g., smart electronic ballast SEB1) is connected with the output terminals (i.e., terminals RT1 through RT6) of the power conditioner (CPCa), any number of the output terminals may be connected to each other and/or to ground without causing switching transistors FET1/FET2 to become conductive or damaged. Moreover, a person—ground-connected or not—can not get a hazardous electric shock by touching any one or more of the output terminals.

That is, with respect to electric shock hazard, central power conditioner CPCa functions like a Class-2 power source.

(r) Coiled connect cord CCC1 (shown in FIG. 3 to connect smart electronic ballast SEB1 with central power conditioner CPCa). The conductors within cord CCC1 connecting between terminals RT1 and RTa1, as well as between terminals RT6 and RTa6, will inherently have resistance; which therefore means that there will be a voltage drop between terminals RT1 and RTa1, as well as between terminals RTa6 and RT6.

Thus, by knowing the magnitude of the resistance between terminals RTa6 and RT6, the magnitude of the current flowing therebetween will be known by virtue of knowing the magnitude of the difference between the voltage at terminal RTa6 and the voltage at terminal RT6.

In the circuit of FIG. 5—with ballast SEB1 connected therewith, and since terminal RTa6 is connected with terminal RTa5, and since terminal RTa5 is connected with terminal RT5—this difference is exactly what is applied to the input of opto-coupler OC2; which therefore means that the output of opto-coupler OC2 is a measure of the magnitude of the current flowing from terminal RTa6 and RT6.

{The magnitude of the current drawn by opto-coupler OC2 is arranged to be very small compared with the magnitude of the load current drawn by ballast SEB1; which means that the effect of the resistance of the conductor (in cord CCC1) connecting terminal RTa5 with terminal RT5 can be neglected.}

(s) In FIG. 4, instead of connecting the 10 kHz ground-fault-probing voltage between main filter capacitor MFC and auxiliary filter capacitor AFC, it may in some situations be more advantagous to connect the 1 kHz ground-fault-probing voltage between one of the terminals of main filter capacitor MFC (e.g., the B− terminal) and the junction between two series-connected filter capacitors connected across output terminals RT6 and RT1.

However, instead of the above-described arrangement with two series-connected capacitors across the power conditioner's main output terminals, the same end result may be attained by instead connecting one capacitor between terminals B'− & RT6 and another capacitor between terminals B'+ & RT1, but otherwise leaving the circuit of FIG. 4 unchanged.

With either of the two above-described arrangements (whether or not switching transistors FET1/FET2 are switched ON) the power conditioner will exhibit a 10 kHz ground-fault-probing voltage between its power input terminals (ACIT1/ACIT2) and its power output terminals (RT1/RT6), thereby permitting continuous probing for a ground-fault condition and—for an indefinitely long duration (rather than for only 10 seconds at a time)—to prevent switching transistors (FET1/FET2) from switching ON as long as a ground-fault condition does indeed exist.

{In the term "between power input terminals ACIT1/ACIT2 and power output terminals RT1/RT6", each pair of terminals is regarded as a single terminal as far as the 10 kHz voltage is concerned. In other words: (i) power input terminals ACIT1 and AVIT2 are considered to be electrically connected together (i.e., short-circuited) with respect to 10 kHz current; and (ii) power output terminals RT1 and RT6 are considered to be electrically connected together (i.e., short-circuited) with respect to 10 kHz current.}

(t) The DC supply voltage to the bridge inverter of FIG. 5 is supplied through a current feed inductor (CFI), whose purpose is that of maintaining the magnitude of the current flowing from the DC supply lines (i.e., DC− and DC+) to the bridge inverter substantially constant throughout the duration of a single complete cycle of the bridge inverter's oscillations (i.e., about 33 micro-seconds). However, over a period substantially longer than the duration of such a single complete cycle, the magnitude of the current is free to change and to assume whatever level might be dictated by the loading on the bridge inverter's output.

The purpose of filter capacitor FCb in FIG. 5 is that of permitting the free flow of high-frequency (e.g., 30 kHz) current between the DC− bus and the DC+ bus.

Instead of using a Diac trigger means, triggering the inverter into self-sustaining oscillations may be accomplished by coupling a small amount of 10 kHz current into inductor Lm (such as via an auxiliary winding thereon); which 10 kHz current may be obtained from terminals RTa1 and RTa3 by way of a current-limiting resistor.

(u) In many situations, it is desirable to have any terminals within the lighting fixture (e.g., within fluorescent lighting panel FLP1) electro-conductively (i.e., galvanically) isolated from the power line conductors.

In the particular arrangement of FIG. 6, such is indeed the case, assuming the actual presence of the capacitor shown in phantom in the conductor connecting terminal RTb2 to the cathode of diode Db2.

{If such galvanic isolation is not necessary, the "phantom" capacitor may be replaced with a short circuit.}

With the "phantom" capacitor in place, however, all the terminals within fluorescent lighting panel are galvanically isolated from the power line conductors as well as from any of the output terminals of the central power converter (CPCa)—as are also all the output terminals of the smart electronic ballast (SEB1).

(v) With reference to FIGS. 5 and 6, in some other situations, it is not necessary to provide the interlock function served by terminal pairs RTb1/RTb2 and RTc1/RTc2; in which situations these terminals are removed entirely and capacitor Cb is connected with the cathode of diode Db2 directly (as indicated by the phantom line) instead of via the indicated interlock means.

(w) The smart electronic ballast (SEB1) is removably mounted onto the fluorescent lighting panel (FLP) (e.g., by way of Velcro attachment means and plug-receptacle means); which permits the lighting panel to be discarded after the lamps therein have ceased to function, without therefore also having to discard the ballast.

In fact, in its preferred embodiment, the lighting system of FIG. 3 has "throw-away" "sealed beam" lighting panels; which means that the fluorescent lamps are in effect sealed within the lighting panel, thereby minimizing the opportunity for dust to diminish the lighting function thereof.

(x) Receptacle means RM of FIG. 4 corresponds to power output receptacle POR1 of FIG. 3.

(y) Although the connection between each output port of the central power conditioner (CPCa) and each of the smart electronic ballasts (e.g., SEB1) is effectuated by way of a total of six conductors, as would be well understood by a person having but ordinary skill in the art most pertinent hereto, by using one or another well known form of carrier technique, the connection could in fact be effectuated by as few as two conductors. More particularly, since the main power transfer is effecuated by DC, both auxiliary power transfer as well as information transfer may be effectuated by an AC voltage.

(z) The power conditioner of FIG. 4, by virtue of up-converter UC, draws a substantially sinusoidal current from the power line. More particularly, the current drawn by the power conditioner from the power line exhibits less than 10% total harmonic distortion.

(aa) The coiled connect cords (e.g., CCC1 of FIG. 3 or CC1 of FIG. 1) are characterized in that they are constructed in a manner similar to that of the telephone cord usually used for connecting a telephone hand-set with the base telephone instrument.

(ab) In the lighting systems of FIGS. 1 and 3, the distance between the permanent ceiling and the suspended ceiling is usually between 0.5 foot and six feet.

(ac) With respect to the lighting system of FIG. 3, it is emphasized that, instead of being mounted on the fluorescent lighting panels (e.g., FLP1), the smart electronic ballasts (e.g., SEB1) may be mounted on or near one of the central power conditioners (e.g., CPCa); in which case coiled connect cords would extend between the output terminals of the ballasts and the input terminals of the lighting panel.

With this arrangement, it would be advantageous to eliminate the lock-out feature associated with two of the input terminals on each lighting panel (i.e., terminals RTc1/RTc2 in case of lighting panel FLP1). Thus, with terminal pairs RTc1/RTc2 and RTb1/RTb2 both eliminated, the connect cord required for connecting between the ballast and its associated lighting panel would need to have only four conductors.

In this case, even with the lighting panel being powered, no galvanic (i.e., electrically conductive) connection exists between the power line conductors and any of the electrical terminals of any of the lighting panels.

I claim:

1. An arrangement comprising:
   a pair of power line conductors across which exists an AC power line voltage of frequency lower than 100 Hz; the amount of power available from the power line conductors being distinctly higher than the maximum amount usually considered safe from fire-initiation hazard;
   a power conditioner having (i) a pair of power input terminals connected with the power line conductors, and (ii) a pair of DC output terminals across which is conditionally provided a DC supply voltage; the power conditioner including sensing and control circuitry operative to prevent any power drawn from the DC output terminals from exceeding the maximum amount usually considered safe from fire initiation hazard;
   an electronic ballast having (i) a pair of DC input terminals disconnectably connected with the DC output terminals by way of a flexible connect cord, and (ii) a pair of AC output terminals at which is conditionally provided an AC ballast voltage of frequency higher than 10 kHz; and
   a lighting panel mounted in a ceiling grid system suspended some distance below a permanent ceiling; the lighting panel having (i) a pair of AC input terminals connected with the AC output terminals, and (ii) gas discharge lamp means connected in circuit with the AC input terminals.

2. The arrangement of claim 1 further characterized in that: (i) the waveform of the AC power line voltage is substantially sinusoidal; and (ii) any current drawn by the power conditioner from the power line conductors is of substantially sinusoidal waveform, a substantially sinusoidal waveform being defined as a waveform having less than 10% total harmonic distortion.

3. The arrangement of claim 1 further characterized in that the DC supply voltage is not present except when the power conditioner's DC output terminals are indeed connected with the electronic ballast's DC input terminals.

4. The arrangement of claim 1 further characterized in that the flexible connect cord has a length in excess of one foot.

5. The arrangement of claim 1 further characterized in that the connect cord is coiled.

6. The arrangement of claim 1 further characterized in that the lighting panel's AC input terminals are disconnectably connected with the electronic ballast's AC output terminals.

7. The arrangement of claim 1 further characterized in that the power conditioner has at least one additional pair of DC output terminals; which additional pair of DC output terminals is also prevented from supplying more power than what is usually considered safe from fire-initiation hazard.

8. The arrangement of claim 1 wherein the maximum amount of power usually considered safe from fire-initiation hazard is defined as being 100 Watt.

9. The arrangement of claim 1 further characterized in that the absolute magnitude of the DC supply voltage is distinctly higher than the absolute peak magnitude of the AC power line voltage.

10. The arrangement of claim 1 further characterized in that the electronic ballast is detachably attached to the lighting panel.

11. The arrangement of claim 1 further characterized in that the lighting panel has no electrical conductor having galvanic connection with either of the power line conductors.

12. The arrangement of claim 1 further characterized in that, as long as the electronic ballast is not connected with the power conditioner, a ground-connected person will not be subjected to a hazardous electric shock if touching either of the DC output terminals.

13. The arrangement of claim 1 further characterized in that, as long as the electronic ballast is not connected with the power conditioner, a person will not be subjected to a hazardous electric shock even if touching both of the DC output terminals.

14. The arrangement of claim 1 wherein the connect cord has a linear length substantially longer than the distance between the DC output terminals and the DC input terminals.

15. An arrangement comprising:
   a pair of power line conductors across which exists an AC power line voltage; the amount of power available from the power line conductors being far higher than 100 Watt;
   a power conditioner having: (i) a pair of power input terminals connected with the power line conductors; and (ii) plural power output ports, each one of which having a pair of DC output terminals and being conditionally operable to provide a DC supply voltage across this pair of DC output terminals;
   plural lighting means; each one: (i) having ballasting means and lamp means, the ballasting means being connected in circuit with the lamp means and conditionally operative to provide an alternating lamp current thereto; (ii) being mounted in a ceiling grid suspended some distance below a permanent ceiling; (iii) having a power input port with a pair of DC input terminals; and (iv) producing luminous output whenever an appropriate DC voltage is provided across the DC input terminals; and plural connect cords; each connect cord being operable to provide disconnectable connection between one of the plural power output ports and the power input port of one of the plural lighting means, thereby to cause said DC supply voltage to be provided across the DC input terminals of that power input port and to constitute said appropriate DC voltage;

the arrangement being further characterized in that the power conditioner provides the DC supply voltage across the DC output terminals of a given one of its plural power output ports only if that given power output port is connected with the power input port of one of the plural lighting means by way of one of the plural connect cords.

16. The arrangement of claim 15 additionally characterized in that the absolute magnitude of the DC supply voltage is distinctly higher than the absolute peak magnitude of the AC power line voltage.

17. The arangement of claim 15 additionally characterized in that the maximum amount of power available from any one of the plural power output ports is 100 Watt.

18. The arrangement of claim 15 wherein at least one of the plural connect cords is characterized as being a coiled cord.

19. The arrangement of claim 15 wherein at least one of the connect cords is characterized as being stretchable.

20. The arrangement of claim 15 additionally characterized in that the power conditioner provides, to a lighting means connected with one of its power output ports, not only said DC supply voltage but also an auxiliary AC voltage of frequency different from that of said alternating lamp current.

21. An arrangement comprising:
a pair of power line conductors across which exists an AC power line voltage;
a power conditioner: (i) having a pair of power input terminals connected with the power line conductors; (ii) having a power output port with a pair of DC output terminals; and (iii) being conditionally operable to provide a DC supply voltage across the DC output terminals;
a lighting means: (i) having ballasting means and lamp means, the ballasting means being connected in circuit with the lamp means and conditionally operative to provide an alternating lamp current thereto; (ii) having a power input port with a pair of DC input terminals; and (iii) producing luminous output whenever an appropriate DC voltage is provided across the DC input terminals; and
a connect cord operable to provide disconnectable connection between the power output port and the power input port, thereby to cause said DC supply voltage to be provided across the DC input terminals of the power input port and to constitute said appropriate DC voltage;
the arrangement being further characterized in that the power conditioner provides the DC supply voltage across the DC output terminals of its power output port only if the power output port is connected with the power input port by way of the connect cord.

22. The arrangement of claim 21 additionally characterized in that: (i) the power output port includes more terminals than said pair of DC output terminals; and (ii) whenever said connect cord is disconnected, if a ground-connected person were to touch any one of the terminals of the power output port, he would not be subjected to an electric shock-hazard.

23. The arrangement of claim 21 additionally characterized in that: (i) the power output port includes more terminals than said pair of DC output terminals; and (ii) whenever said connect cord is disconnected, an auxiliary AC voltage exists between two of the terminals of the power output port.

24. An arrangement comprising:
a pair of power line conductors across which exists an AC power line voltage;
a power conditioner: (i) having a pair of power input terminals connected with the power line conductors; (ii) having a power output port with a pair of DC output terminals; and (iii) being conditionally operable to provide a DC supply voltage across the DC output terminals; and
a light-producing means having a power input port with a pair of DC input terminals; the power input port being disconnectably connected with the power output port; the DC output voltage existing across the DC input terminals as well, but only as long as the power input port is indeed connected with the power output port;
the arrangement being further characterized in that, if the power input port were not to be connected with the power output port, the DC supply voltage would not exist across the DC output terminals.

25. An arrangement comprising:
a light-generating structure having a power input port with a pair of DC input terminals; the light-generating structure being functional to generate light whenever an appropriate DC voltage exists across the DC input terminals; and
a power conditioner: (i) having a pair of power input terminals connected with the AC power line voltage of an ordinary electric utility power line; (ii) having a power output port with a pair of DC output terminals, the power output port being disconnectably connected with the power input port in such manner that the DC output terminals get connected with the DC input terminals and such that any voltage existing between the DC output terminals must exist across the DC input terminals as well; and (iii) being operable, but only when the power output port is indeed connected with the power input port, to provide a DC supply voltage across the DC output terminals, the DC supply voltage, when indeed present across the DC input terminals, constituting said appropriate DC voltage.

26. The arrangement of claim 25 further characterized in that the absolute magnitude of the DC supply voltage, when it indeed exists across the DC output terminals, is distinctly higher than the peak absolute magnitude of the AC power line voltage.

27. An arrangement comprising:
a power supply (i) having a pair of AC input terminals connected with the AC power line voltage on the power line conductors of an ordinary electric utility power line, (ii) including a pair of DC terminals across which exists a DC voltage, and (iii) having a pair of power output terminals across which is supplied an output voltage; the power supply being further characterized by including circuitry operative to limit the maximum amount of power extractable from said pair of power output terminals to 100 Watt, and
a light-generating structure mounted in a ceiling grid suspended some distance below a permanent ceiling and having a pair of power input terminals connected with the power output terminals by way of a flexible connect cord, thereby to be provided with said output voltage across its power input terminals, thereby to generate light.

* * * * *